Figures 1, 2:
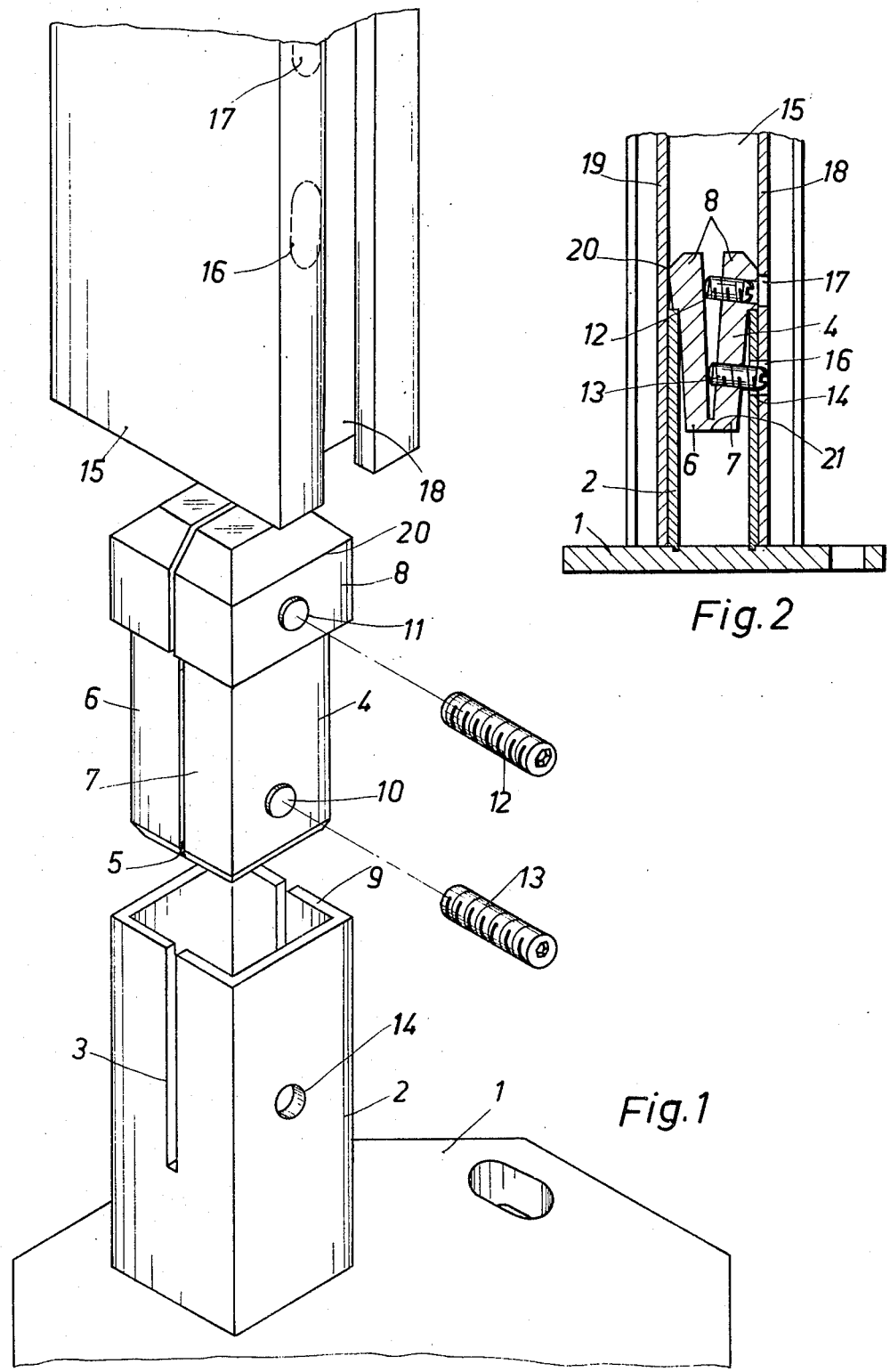

United States Patent [19]

Fleischmann

[11] 4,104,000
[45] Aug. 1, 1978

[54] ARRANGEMENT FOR SUPPORTING A RAILING AND THE LIKE

[75] Inventor: Horst Fleischmann, Munich, Fed. Rep. of Germany

[73] Assignee: Gebrüder Kömmerling Kunststoffwerke GmbH, Pirmasens, Fed. Rep. of Germany

[21] Appl. No.: 790,138

[22] Filed: Apr. 22, 1977

[30] Foreign Application Priority Data

Apr. 27, 1976 [DE] Fed. Rep. of Germany ........ 2618442

[51] Int. Cl.² .............................................. F16B 7/00
[52] U.S. Cl. ...................................... 403/7; 403/297; 403/373; 403/109; 256/65
[58] Field of Search .................... 403/7, 109, 297, 290, 403/245, 192, 193, 293, 373, 377, 110; 256/59, 65

[56] References Cited

U.S. PATENT DOCUMENTS

| | | | |
|---|---|---|---|
| 1,678,350 | 7/1928 | Ott | 403/297 X |
| 1,707,363 | 4/1929 | Opremchak | 403/290 X |
| 1,891,048 | 12/1932 | Keefe | 403/290 X |
| 2,995,392 | 8/1961 | Kruse | 403/293 |
| 3,204,593 | 9/1965 | Steiner | 403/7 X |

FOREIGN PATENT DOCUMENTS 965,479 7/1964 United Kingdom .................... 403/192

Primary Examiner—Andrew V. Kundrat
Attorney, Agent, or Firm—Michael J. Striker

[57] ABSTRACT

An arrangement for supporting a railing and the like has a hollow base member, a hollow bar-shaped member telescopable over the base member, and a clamping element insertable in the base member and spreadable apart so as to spread the base member into clamping engagement with the bar-shaped member. The clamping element has two clamping portions which are partially separated from each other over a plane extending in a direction of elongation of the clamping element and are movable relative to each other in a direction transverse to the direction of elongation. Means are provided for spreading apart the clamping portion, including screws screwable in one of the clamping portions. The clamping portions each has a section outwardly projecting from the base member and adapted to be spread into clamping engagement with the bar-shaped member. The base member and the bar-shaped member have holes provided in walls adjacent to the clamping portion so that the screws may be screwed in the latter through such holes.

14 Claims, 2 Drawing Figures

U.S. Patent

Aug. 1, 1978

4,104,000

ARRANGEMENT FOR SUPPORTING A RAILING AND THE LIKE

BACKGROUND OF THE INVENTION

The present invention relates to an arrangement for supporting a railing, a guardrail, a fence and the like. More particularly it relates to an arrangement for supporting a railing or the like which comprises a base member and a bar-shaped member telescopable over the base member.

Arrangements for supporting a handrail and the like have been proposed comprising a base member mounted on a bottom plate which anchors the former in a support, e.g. concrete, and a hollow bar-shaped member telescopable over the base member and fixable thereto by an adhesive. In such arrangement, after fixing the hollow bar-shaped member relative to the base member the process of connecting the respective parts must be stopped until the adhesive is sufficiently hardened. This constitutes an essential disadvantage of the known arrangement since it delays the further mounting of other parts. The above-mentioned connection by use of an adhesive is also expensive because it requires some preliminary operations, such as for instance, cleaning of the surface to be covered with the adhesive, preparing and applying the adhesive and the like. The connection by an adhesive is also disadvantageous when the arrangement must be demounted without being damaged.

SUMMARY OF THE INVENTION

Accordingly, it is a general object of the present invention to provide an arrangement for supporting a railing and the like which avoids the disadvantages of the prior-art arrangements.

More particularly, it is an object of the present invention to provide an arrangement for supporting a railing and the like which can be mounted and demounted easier than the arrangements known in the art.

Still another object of the present invention is to provide an a arrangement for supporting a railing and the like which does not require any pretreating of the respective parts and assures a continuous mounting of the latter without delay.

An additional object of the present invention is to provide an arrangement for supporting a railing and the like which is simple in construction, easy to manufacture and mount and which, therefore, is relatively inexpensive.

In keeping with these objects and with others which will become apparent hereinafter, one feature of the present invention is that the arrangement for supporting a railing and the like comprises an elongated clamping element insertable in a base member which clamping element includes two clamping portions separated from each other in a plane extending in a direction of elongation thereof and movable relative to each other in a transverse direction. Means are provided for spreading apart the clamping portions of the clamping element in the transverse direction so as to spread the base member into clamping engagement with a hollow bar-shaped member telescoped over the base member. The spreading means include at least one screw which is screwable in one of the clamping portions through a hole provided in the base member and/or the bar-shaped member.

In such construction the screw acts upon the clamping portions having substantially large surfaces, and therefore an applied force is transmitted to the base member and the bar-shaped member through the large surfaces. In this case, the clamping parts may be made of a relatively weak material such as, for instance, a light metal, but will nevertheless be able to transmit substantial forces and firmly connect the respective parts of the arrangement.

The arrangement in accordance with the present invention is simple in construction and, therefore, is reliable in operation. The arrangement can be assembled in a simple and inexpensive manner without special preliminary operaions. The clamping element is inserted in the base member, then the hollow bar-shaped member is telescoped over the base member, a screw is screwed in a threaded hole of one of the clamping portions of the clamping elements through the hole provided in an adjacent wall of the bar-shaped member so that the screw abuts against the other clamping portion and spreads the clamping portions apart, which latter in turn urge the base member into clamping engagement with the barshaped member.

The clamping portions of the clamping elements may be fully or partially separated from each other. In the latter case they are separated from each other over a length corresponding to the major part of the length of the clamping element so that a small web remains connecting the clamping portions with each other. The web must be sufficiently flexible so as to permit the clamping portions to be spread apart from each other. However, it is advantageous when the clamping portions are separated from each other over the entire length of the clamping element, because in such case tolerance variations between the clamping element and the respective parts of the arrangement clamped by the same may be essentially greater than in the case of partial separation of the clamping portions from each other.

Another feature of the present invention is that upper end sections of the clamping portions of the clamping element together form a clamping head upwardly projecting from the base member. By spreading apart the clamping portions of the clamping element, the clamping head is spread into clamping engagement with the hollow bar-shaped member. In accordance with this embodiment the base member is also spread apart by the clamping element so that clamping engagement between the base member and the bar-shaped member is also attained by means of the clamping element. In this case, the screw for spreading the clamping element is preferably screwed in the clamping head thereof. The clamping head has an outer contour corresponding to the inner contour of the base member. A sufficient clamping connection between the bar-shaped member and the base member is provided when the clamping element having the clamping head with the spreading screw is inserted with a narrow clearance in the base member having a circumferentially complete contour. This assures firm clamping of the clamping element in the base member and firm clamping of the clamping head in the bar-shaped member after spreading of the clamping portions apart from each other. According to an additional feature of the present invention, the base member is not circumferentially complete but has a slot extending in a plane parallel to the plane in which the clamping portions of the clamping element are separated from each other. In such construction the base member can be so spread that it abuts against the bar-shaped member in mating engagement. The clamping element may be fully inserted into the interior of the at lower temperature than heretofore required, a 350° F. or higher temperature bake being normally essential in the prior art to obtain the needed thermosetting cure. Films which provide good properties by baking at a temperature of less than 300° F. are a feature of this invention. This means that after the film is electrodeposited and the coated anode is removed from the bath, it can simply be allowed to dry in air, or given a minimal low temperature dry, either with or without rinsing the same with water.

In many instances it is desired to electrodeposit films which are flexible and extensible. This is not possible with the low molecular weight solution copolymers normally used since these are brittle unless highly cross-linked, usually with aminoplast resin, and the cross-linked films are not extensible. The emulsion copolymers used herein are of much higher molecular weight, and cross-linking can either be omitted or minimized. This allows electrodeposition of films possessing different and more desirable physical and chemical properties than were heretofore possible. Specifically, coatings can be provided which are tougher, more flexible and possess much greater impact resistance.

While the aminoplast resin used herein are the same water soluble and water dispersible materials normally used, such as hexamethoxy methyl melamine or water dispersible partially ethylated or propylated derivatives thereof, they are used herein in smaller amount. Thus, we use 2–10% of aminoplast resin based on total resin, while 15–30% is normally used. This lowers the cross link density and yields of less brittle film. Instead of or in addition to the use of aminoplast resins, one can employ water dispersible heat-hardening phenolic resin, as described in U.S. Pat. No. 3,963,663 issued June 15, 1976, especially with a copolymer containing an amine monomer, such as dimethyl amino ethyl acrylate.

While high molecular weight is useful herein, a mercaptan may be used in the emulsion copolymerization to moderate molecular weight and thereby obtain better gloss while still achieving some of the objectives of this invention. The use of mercaptans to lower molecular weight is itself well known, as are the mercaptans useful for this purpose.

The polyanionic phosphate-based emulsifying agents which are useful in this invention are known materials. In general, they are polyanionic phosphate ester surfactants which are the esterification reaction product of about 1 mol of phosphoric acid per hydroxy equivalent in a nonionic surfactant having a polyoxyethylene hydrophilic chain. The products which are useful herein will be easily understood when it is recalled that nonionic surfactants are formed when ethylene oxide is adducted upon a hydrophobic organic compound in order to provide an hydroxy terminated hydrophilic polyoxyethylene chain on the hydrophobe. Typical hydrophobes are constituted by long chain hydrocarbon-substituted phenols, such as octyl phenol and nonyl phenol. The ethylene oxide chain typically contains from about 5 to about 50 mols of ethylene oxide per mol of alkyl phenol. Instead of an alkyl phenol, one can also employ long chain alcohols or even polyfunctional hydrophobes, such as polyoxypropylene glycol having a molecular weight in excess of about 800.

Regardless of the specific hydrophobe selected, the nonionic surfactant structure includes a hydrophobic entity which is preferably a long chain hydrocarbon containing from 6 to 22 carbon atoms, and an hydroxy terminated hydrophilic polyoxyethylene group. The anionic surfactants useful herein are formed by simply reacting 1 mol of phosphoric acid with each hydroxy equivalent in the starting nonionic surfactant. The reaction is a simple esterification reaction with the water of esterification being removed to facilitate the reaction.

Since phosphoric acid contains 3 acidic OH groups per molecule and since only one of these becomes involved in the formation of the phosphate ester, the other two acidic OH groups are left unreacted, and these can be neutralized with a base which is preferably an amine. Appropriate amines can be of diverse type and the amines which are useful for solubilizing organic acidic materials are themselves well known. Volatile amines are preferred and will be illustrated herein using diisopropyl amine. The neutralized product ionizes in water to form a polyanionic surfactant, one anionic group being formed for each of the unesterified neutralized OH groups in the phosphoric acid reactant.

The surfactants which are useful herein may thus be characterized as monoesters of phosphoric acid with a polyoxyethylene-containing nonionic surfactant.

It is to be understood that other nonionic surfactants may be present during the aqueous emulsion copolymerization so long as the required proportion of the polyanionic phosphate-based emulsifying agent is present.

Aqueous emulsions are usually formulated at high solids content, but low solids content is essential for an electrocoating bath, e.g., a resin solids content of 4%–25%, preferably 6–18%.

The invention is illustrated in the examples which follow, it being understood that all proportions in this specification and claims are by weight unless otherwise stated.

EXAMPLE

There are charged to a reactor 758 parts of distilled water, 5.4 parts of ammonium persulfate, and 0.9 parts of sodium dodecyl benzene sulfonate. There is then formed a monomer emulsion by adding a mixture of monomers to 728 parts of water containing 51.5 parts of a polyanionic phosphate ester surfactant (see note 1), 18 parts of diisopropanol amine, and 36 parts of a nonionic surfactant (see note 2). The monomer mixture which is emulsified is as follows:

| Material | Parts | Percent of Total Monomers |
| --- | --- | --- |
| Styrene | 270 | 15 |
| Methyl methacrylate | 477 | 26.5 |
| n-Butyl acrylate | 927 | 51.5 |
| 2-Hydroxyethyl methacrylate (94% purity) | 96 | 5 |
| Methacrylic acid | 36 | 2 |
| t-Butyl mercaptan | 18 | 1 |
| | | 101 |

The monomer emulsion is added to the reactor incrementally over a period of 2½ hours. The reactor charge is preheated to a temperature of 80° C. After all of the monomer emulsion is added, the temperature of 80° C. is maintained for two hours, during which time 10 parts of water and 14 parts of diisopropanol amine are added. The theoretical solids content is 55%, and the actual solids content is 54.5%, indicating almost complete conversion of monomer to polymer. The emulsion has a pH of 6.9 and a viscosity of 516 centipoises (Brookfield, 20 RPM, #2 spindle). The emulsion copolymer particles have an average diameter of 0.17 micron and a $T_g$ a threaded hole 11 is provided in the upper section of the clamping portion 7 forming the clamping head 8. Threaded holes fully pass through the clamping portion 7 in a direction transverse to the plane of the slot 5 and therefore have a substantial length. Screws 12 and 13 are screwed in the threaded holes whose length assures transmission of a substantial force, and thereby the clamping portions 6 and 7 of the clamping element 6 are also spread apart from each other with a great force. Inner end portions of the screws, after abutting against the clamping portion 6, urge the latter away from the clamping portion 7.

When the clamping element 4 is inserted in the base member 2 and abuts against the face surface 9 of the latter, the threaded hole 10 of the clamping portion 7 is aligned with the through hole 14 provided in the adjacent wall of the base member 2. The screw 13 is screwed in the threaded hole of the clamping portion 7 through the hole 14 of the base member 2. Prior to the above steps, a hollow bar-shaped member 15 is telescoped over the base member 2 with the clamping element 4 inserted in the latter until a lower portion of the bar-shaped member 15 abuts on the bottom plate 1. In such position, the through hole 14 of the base member 2 together with the threaded hole 10 in the lower section of the clamping element 4, and the threaded hole 11 in the upper section of the clamping element 4 are into alignment with oblong holes 16 and 17, respectively, provided in an adjacent wall 18 of the bar-shaped member 15. Then the screw 13 is screwed in the threaded hole 10 of the clamping portion 7 through the oblong hole 16 of the bar-shaped member 15 and the through hole 14 of the base member 2, whereas the screw 12 is screwed in the threaded hole 11 of the clamping head 8 through the oblong hole 17 in the bar-shaped member 2. The screws 12 and 13 are screwed until they abut against the clamping portion 6 and thereafter spread apart the clamping portions 6 and 7 so that the latter abut against the base member 2 and the hollow bar-shaped member 15 with a great force and over a large surface.

As shown in FIG. 2, the clamping head 8 of the clamping portions 6 and 7 is in clamping engagement with opposite walls 18 and 19 of the bar-shaped member 15 whose walls are parallel relative to the plane of the slot 3, whereas the lower sections of the clamping portions 6 and 7 spread the base member 2 into clamping engatement with the walls 18 and 19 of the bar-shaped member 15. A deviation of the clamping portions 6 and 7 from their parallel position is clearly shown in FIG. 2.

In the embodiment shown in FIG. 2 the slot 5 does not fully separate the clamping portions 6 and 7 from each other, but the clamping portions 6 and 7 are connected to each other in a region of their lower ends by a web 21.

As also clearly shown in FIG. 2, the screw 13 which is screwed in the threaded hole 10 of the clamping portion 7 passes through the holes 14 and 16 of the base member 2 and the bar-shaped member 15 so that the clamping element 4 is secured to the base member 2 and to the hollow bar-shaped member 15 by the screw 13 in mating engagement. At the same time, the similar mating engagement is provided between the base member 2 and the bar-shaped member 15. Contrary to this, the screw 12 screwed in the clamping head 8 has a lesser length than the length of the screw 13 and is so screwed in the clamping element 4 that it does not project into the hole 17 of the bar-shaped member 15.

The bar-shaped member 15 has two side portions each having a T-shaped groove so that connecting portions of the railing or the like can be clamped in the respective grooved portion of the bar-shaped member 15. This is not hindered by the screws since the latter do not project outwardly beyond the outer portions of the grooves. An upper portion of the bar-shaped member 15 also has connecting means for connecting handrail or the like thereto.

The bar-shaped member may be of metal material and manufactured by a drawing operation, whereas the other parts of the arrangement may also be of metal and manufactured by a casting operation. For instance, the clamping element may be made of a zinc alloy, whereas the base member and the bar-shaped member may be made of an aluminum alloy.

It is understood that while the specific construction of the arrangement is shown in FIGS. 1 and 2, various modifications may be made within the spirit of the present invention.

The clamping portions 6 and 7 may be fully separated from each other so that they are not connected by a web portion. The base member 2 may be formed as a circumferentially complete member without the slot 3 shown in FIG. 1. The clamping element 4 may be fully inserted in the base member 2 so that the former does not project outwardly beyond the latter. The through hole 14 in the base member 2 may be formed as an oblong hole substantially corresponding in a shape to the shape of the oblong holes in the bar-shaped member 15. The base member 2 may be provided with an additional abutment portion for abutting the clamping element 4 against the same, which additional abutment portion may project outwardly beyond the outer contour of the base member 2.

It will be understood that each of the elements described above, or two or more together, may also find a useful application in other types of constructions differing from the types described above.

While the invention has been illustrated and described as embodied in an arrangement for supporting a railing and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A supporting arrangement for a railing and the like, comprising a hollow base member; a hollow bar-shaped member telescopable over said base member; an elongated clamping element including at least two clamping portions which are at least partially separated from each other over a plane extending in a direction of elongation of said clamping element and movable relative to each other in a direction substantially transverse to said direction of elongation of said clamping element, said clamping portions having first sections insertable in and engageable with said base member, and second sections projecting outwardly beyond said base member as well as insertable in and engageable with said bar-shaped member; and means for spreading apart said clamping portions of said clamping element in said transverse direction so that said first sections of said clamping portions are spread apart and thereby spread said base member into clamping engagement with said bar-shaped member, whereas said second sections of said clamping portions are spread into clamping engagement with said bar-shaped member.

2. The arrangement as defined in claim 1, wherein said clamping portions of said clamping element are separated from each other over a length corresponding to the major part of the length of said clamping element in said direction of elongation thereof.

3. The arrangement as defined in claim 1, wherein said spreading means includes at least one screw screwable in one of said clamping portions of said clamping element.

4. The arrangement as defined in claim 3, wherein said base member has a wall adjacent to said one clamping portion of said clamping element and provided with at least one hole so that said screw can be screwed in said one clamping portion through said hole of said base member.

5. The arrangement as defined in claim 3, wherein said bar-shaped member has a wall adjacent to said one clamping portion of said clamping element and provided with at least one hole so that said screw can be screwed in said one clamping portion through said hole in said bar-shaped member.

6. The arrangement as defined in claim 1, wherein said second sections of said clamping portions form together a head part of said clamping element.

7. The arrangement as defined in claim 6, wherein said spreading means include at least one screw screwable in said head part of said clamping element.

8. The arrangement as defined in claim 1, wherein said base member has a slot located in a plane parallel to the plane over which said clamping portions of said clamping element are separated from each other.

9. The arrangement as defined in claim 1, wherein said spreading means includes at least one screw screwable in said first section of one of said clamping portions.

10. The arrangement as defined in claim 9, wherein said spreading means include another screw screwable in said second section of said one clamping portion.

11. The arrangement as defined in claim 9, wherein said base member has a wall adjacent to said one clamping portion of said clamping element and provided with at least one hole so that said one screw can be screwed in said first section of said one clamping portion through said hole of said base member.

12. The arrangement as defined in claim 11, wherein said bar-shaped member has a wall adjacent to said one clamping portion of said clamping element and provided with at least one hole so that said other screw can be screwed in said second section of said one clamping portion through said hole of said bar-shaped member.

13. The arrangement as defined in claim 11, wherein said bar-shaped member has a wall adjacent to said clamping portion of said clamping element and provided with at least one hole alignable with said one hole of said base member so that said second screw can be screwed in said first section of said one clamping portion through said hole of said bar-shaped member and said hole of said base member aligned with each other.

14. The arrangement as defined in claim 1, wherein said base member has an abutment portion and said clamping element is insertable in said base member until it abuts against said abutment portion.

* * * * *